(12) United States Patent
Ferrario et al.

(10) Patent No.: US 6,935,183 B2
(45) Date of Patent: Aug. 30, 2005

(54) PORTABLE SYSTEM FOR MEASURING THE INTERNAL PRESSURE OF A VACUUM INSULATING PANELS

(75) Inventors: Bruno Ferrario, Rescaldina (IT);
Pierattilio Di Gregorio, Sulmona (IT);
Robert Giannantonio, Gallarate (IT);
Raffaele Pozzi, Varedo (IT); Gianluca Galliani, Milan (IT)

(73) Assignee: SAES Getters S.p.A., Milan (IT)

( * ) Notice: Subject to any disclaimer, the term of this patent is extended or adjusted under 35 U.S.C. 154(b) by 166 days.

(21) Appl. No.: 10/256,263

(22) Filed: Sep. 27, 2002

(65) Prior Publication Data

US 2003/0094048 A1 May 22, 2003

(30) Foreign Application Priority Data

Sep. 27, 2001 (IT) ..................................... MI2001A2009

(51) Int. Cl.$^7$ ................................................ G01L 7/10
(52) U.S. Cl. ...................................... 73/730; 252/181.7
(58) Field of Search ......................... 73/700, 730, 1.58, 73/1.57; 252/181.7

(56) References Cited

U.S. PATENT DOCUMENTS

| | | | | |
|---|---|---|---|---|
| 4,899,574 A | * | 2/1990 | Potteiger | ........................ 73/52 |
| 6,200,494 B1 | * | 3/2001 | Manini et al. | ........... 252/181.7 |

FOREIGN PATENT DOCUMENTS

| | | |
|---|---|---|
| DE | 29 39 882 A1 | 4/1980 |
| DE | 196 46 876 A1 | 12/1997 |
| DE | 198 13 288 A1 | 9/1999 |
| EP | 0 769 117 B1 | 9/1998 |
| EP | 0 757 920 B1 | 2/2000 |
| JP | 5-142075 | 6/1993 |
| WO | WO 93/15385 | 8/1993 |

* cited by examiner

*Primary Examiner*—Edward Lefkowitz
*Assistant Examiner*—Andre Allen
(74) *Attorney, Agent, or Firm*—Perkins Coie LLP

(57) ABSTRACT

A portable apparatus for measuring the internal pressure of a vacuum panel is described, includes a measuring head having an cavity wherein a sensor of movement is arranged; the device, supported on a portion of the envelope of the panel, detects the movement of a part of the portion of the envelope facing the cavity, following the evacuation of the space formed by said cavity and the part of envelope.

20 Claims, 4 Drawing Sheets

PORTABLE SYSTEM FOR MEASURING THE INTERNAL PRESSURE OF A VACUUM INSULATING PANELS

PRIORITY REFERENCE

This application claims priority under 35 U.S.C. 119 to Italian application MI2001A002009 filed on Sep. 27, 2001, which is incorporated by reference for all purposes.

BACKGROUND

Vacuum panels, particularly those made with plastic materials, are becoming more prevalent for use in many different fields wherein thermal insulation at temperatures lower than about 100° C. is required.

Examples of such vacuum panels include walls of domestic and industrial refrigerators, drinks dispensing machines (wherein thermal insulation is required above all in order to separate the portion of the hot drinks, generally at about 70. degree. C., from that of the cold drinks), or the containers for isothermal transportation. Moreover, applications of these panels are noticeable in the building field or in the car industry. These panels can be used for example to produce a prefabricated insulating wall, by inserting inside said wall an adequate number of panels and by placing them side by side.

A vacuum panel is generally formed of an envelope inside which a filling material is present. The envelope has the function of preventing or reducing as much as possible the entrance of atmospheric gases inside the panel, so as to keep a vacuum level compatible with the thermal insulation degree required by the application. To this purpose, the envelope is made with so-called "barrier" sheets, characterized by a gas permeability being as low as possible, which can be formed of a single component but more frequently are multi-layers. In this last case the "barrier" effect is conferred by one of the component layers, whereas the other layers generally have functions of mechanical support and protection of the barrier layer.

The filling material has also the function of spacing apart the two opposite faces of the envelope when vacuum is created in the panel. During panel evacuation, in fact, the envelope adheres to the filling material, because of the difference between the external atmospheric pressure and the reduced internal pressure of the panel. Said filling material can be inorganic, such as silica powder, glass fibers, aerogels, diatomaceous earth, etc., or organic, such as rigid foams of polyurethane or polystyrene, both in the form of boards and of powders. The filling material must be anyway porous or discontinuous, so that the pores or the interstices can be evacuated.

In order to obtain a good insulation with these panels, it is necessary that the internal pressure remains constant or, in any case, lower than a maximum prefixed value, during the whole life of the panel, or most of it; if this does not occur the insulating capability decreases and, at the same time, the thermal flow from outside towards the inside of the device on which the panel is mounted increases, with consequences on the working of the device itself.

Since the permeation of traces of atmospheric gases into the panel is practically unavoidable, these panels contain in most cases also one or more getter materials capable of sorbing these gases so as to maintain the pressure inside the panel at the desired values. Preferred is the use of systems with two or three getter materials, containing at least a chemical moisture sorber and at least one component chosen among an oxide of a transition metal (having the main function of sorbing hydrogen, CO and hydrocarbons) and an alloy based on barium and lithium (having the main function of sorbing nitrogen). Various getter systems of this kind are sold from the applicant under the name COMBOGETTER®, among which in particular systems containing a moisture sorber and powder of an alloy based on barium and lithium, disclosed in the patent EP-B-769117; and getter systems containing a moisture sorber and an oxide of a transition metal, with the optional addition of powder of an alloy based on barium and lithium, disclosed in patent EP-B-757920.

Irrespective of the use or not of getter materials inside the panel, the users of vacuum panels in final applications have the need of measuring and checking that the internal pressure is the desired one and as declared from producer, and possibly that this pressure is kept for a long period.

Patent JP-A-5-142075 discloses a method for estimating the internal pressure of panels, consisting in inserting into an evacuation chamber an insulating panel, having a recess on its external surface; when the pressure inside the chamber is equal to the internal pressure of the panel, the external envelope raises. On the base of the particularly evident displacement of the part of envelope covering the recess, it is possible to determine the internal pressure of the vacuum panel.

Evacuation chambers are produced also by the company NPC America Corporation, and, as illustrated in specific commercial bulletins, laser sensors are used in these for measuring the movement of the envelope of the panels of which it is desirable to determine the pressure. Since the chamber used for this measurement must be capable of measuring the internal pressure of panels in a wide range of sizes, said chamber may be cumbersome, as well as expensive. Besides, the evacuation of this chamber can take rather long times, as well as the loading phase of the panel inside the chamber itself, since the panel must be arranged carefully and in a reproducible way, in order to meet the geometrical constraints imposed by the optical path of the laser beam. Furthermore, the evacuation chamber cannot be easily moved, because of its weight, and therefore the panels must be moved in an area suitably chosen for the working of the chamber itself.

Hence, there is in the technique a need for a system of small dimensions, cheap, and easy to be handled and moved, which allows the internal pressure of a vacuum panel to be measured quickly, without the necessity to insert said panel completely inside an evacuation chamber.

SUMMARY

The present invention relates to a portable system for measuring the internal pressure of vacuum insulating panels (known as VIP). However, as can be appreciated by those skilled in the art there are other potential applications for the invention.

The present invention provides an easily working system for determining the pressure inside a vacuum panel with the above-mentioned features. This is achieved through a portable system for determining the internal pressure of a vacuum insulating panel, that includes a measuring head which has a jacket that defines a cavity having an open end designed to come into contact with the envelope of the vacuum panel, thus defining a space, and, in said cavity, means to detect the movement of a part of the envelope facing said open end; The invention includes a pumping system connected to said cavity as well as a pressure gauge connected to said cavity. The cavity in the jacket includes a movement detecting means to detect the instant when said movement occurs and/or the pressure value in said space at said instant. There are a variety of such detecting means as can be appreciated by those skilled in the art, which mean that the detection of the pressure can be achieved different ways without departing from the scope and spirit of the invention.

BRIEF DESCRIPTION OF THE DRAWINGS

The advantages and the features of the device will become evident to those skilled in the art from the following detailed description with reference to the attached drawings, in which.

DETAILED DESCRIPTION OF THE INVENTION

Figure 1:
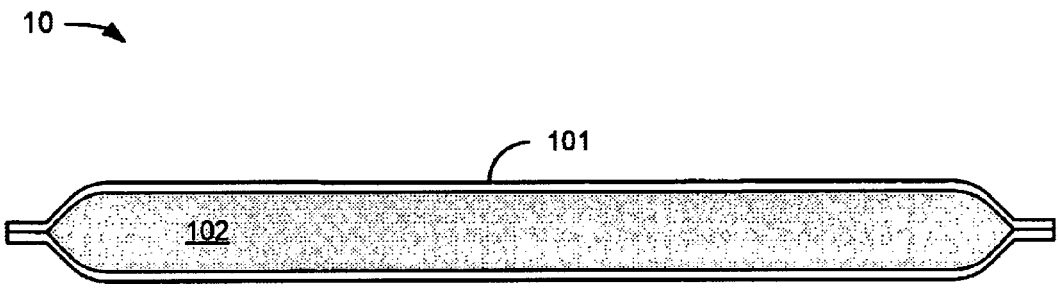
FIG. 1 shows a traditional insulating panel, on a portion of the surface of which the measure of the internal pressure is effected through the device according to the invention.

Referring now to FIG. 1, a section of a panel 10 whose internal pressure is to be measured using the invention is shown. For simplicity it is represented as flat, but it could be also curved or other geometries as would be appreciated by those skilled in the art. The panel includes an envelope or depression, 101, which contains a filling material, 102. This filling material 102 can be inorganic or polymeric, discontinuous or porous type. The envelope 101 can be formed of two barrier sheets, as represented in the figure, whose edges are joined through sealings, or it can be formed of a single barrier sheet, folded and sealed on itself. The panel also contains a getter material, which is not shown in figure, but would be well-understood by those skilled in the art.

Figure 2:
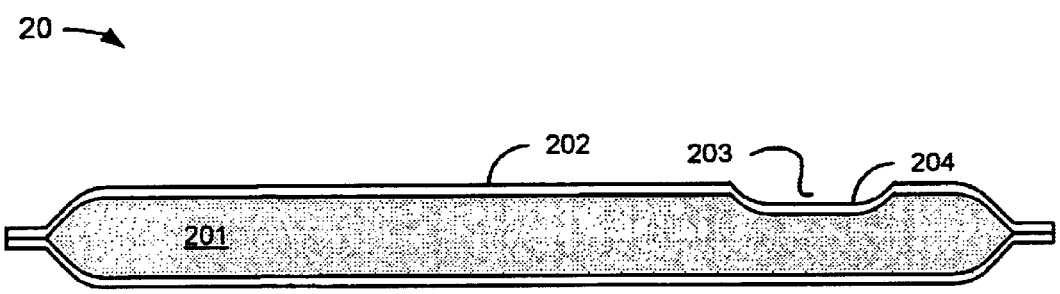
FIG. 2 shows an insulating panel having a recess on its surface, at which the measurement of the internal pressure is effected through the device according to the invention.

Referring now to FIG. 2 a second type of panel 20 is shown. The second type of panel may be used in the invention as the internal pressure can be measured with the invention where this type of panel is used. The second type of panel is formed of filling material 201 and of envelope 202. In the filling material there is a depression, obtained through a simple and immediate mechanical operation, for example through milling or compression, but as can be appreciated by those skilled in the art other methods may be used. When the panel is exposed to the atmosphere the difference in the pressure between the outside and the inside forces the portion of envelope 204 to adhere to the filling material, forming a recess 203 on the surface of the panel. In order to avoid that the insulating capability of the panel is reduced by the presence of this recess, the height of the depressions is negligible with respect to the thickness of the entire panel and preferably is between 1 and 5 mm in a preferred embodiment. Furthermore, the recess can have any geometric shape, but in a preferred embodiment it is circular and has a diameter between 1 and 10 cm.

Figure 3:
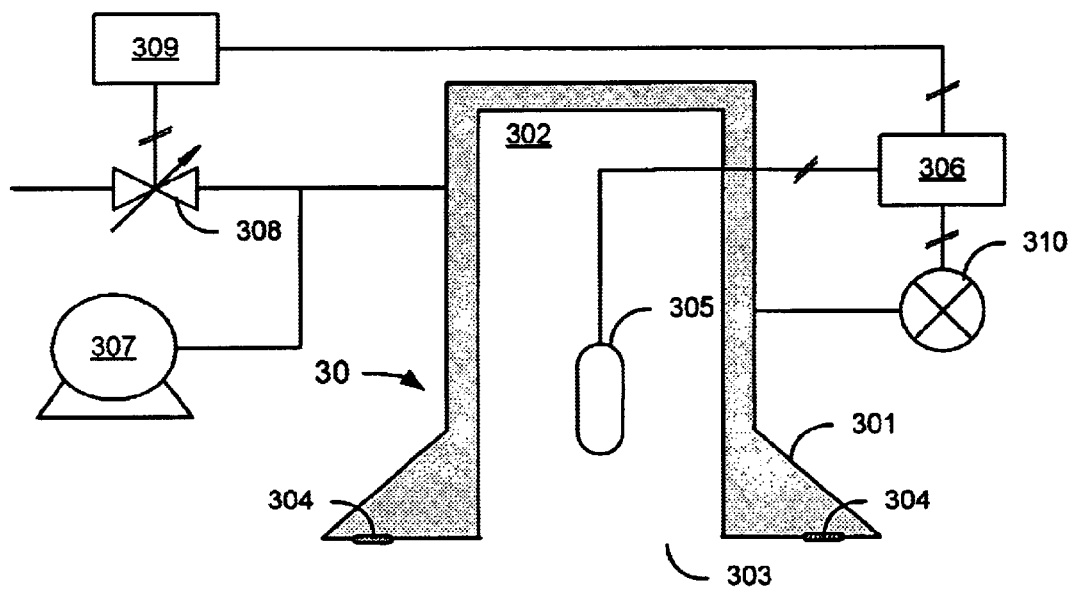
FIG. 3 shows a scheme representing the elements forming the system according to the invention.

FIG. 3 shows one possible detailed construction of the system of the invention in an embodiment, but other geometries are possible in other embodiments, based on the needs.

The system comprises a measuring head 30 having a jacket 301, the jacket 301 defines a cavity or pressure space 302 which has an opening 303 that is designed to come into contact with the external surface of the panel to be measured. On the first or connecting edge of the jacket at opening 303, there is a gasket 304 which in a preferred embodiment is of the O-ring type. The jacket 301 can be made of a material selected among metals, metal alloys, plastic or vitreous materials; the preferred material is steel. The O-rings 304 can be made of silicon rubber, polyurethane, polyethylene tetrafluoride, ethylene-propylene copolymer.

Inside the cavity or pressure space 302 there is a sensor 305 As would be appreciated by those skilled in the art, a wide range of closeness sensors are commercially available. These include the inductive and magnetic type, for example, those sold from the company Sick in Cernusco sul Naviglio, Italy. Preferably in the device according to the invention an inductive closeness sensor is used: it comprises an oscillating circuit, a signal evaluator and an amplifier. The core of the oscillating circuit produces an alternating high frequency electromagnetic field in front of the sensitive face of the sensor. If an object enters the alternating electromagnetic field, induced currents are produced: the additional load requires energy from the oscillating circuit thus reducing the oscillations. The signal evaluator converts this information into an output signal, that is transmitted outside by means of the amplifier. Generally this output signal is a voltage, which decreases when there are induced currents because of the presence of an object; more precisely this voltage decreases with the decrease of the distance between object and sensor.

The closeness sensor 305 of measuring head 30 is linked to an acquisition/elaboration data system 306.

Cavity 302 of measuring head 30 is connected to a pumping system 307 and to a system set to check the pressure inside said cavity, formed of a proportional valve 308 and of relative control unit 309. Proportional valve 308 is connected too to the acquisition/elaboration data system 306 of the device through control unit 309.

On the external surface of jacket 301 of measuring head 30 there is also an outlet to insert a pressure gauge 310, the pressure measure of which is transmitted to the acquisition/elaboration data system 306.

Preferably jacket 301 is formed of a cylindrical hollow body and of a frustoconical portion at the open end 303 of cavity 302. This frustoconical portion lowers the barycenter of the device and thus to increase its stability, when it is supported on a panel.

The total dimensions of measuring head 30 are very small: it is generally about 30 cm high and with a diameter of about 10 cm.

Figure 4:
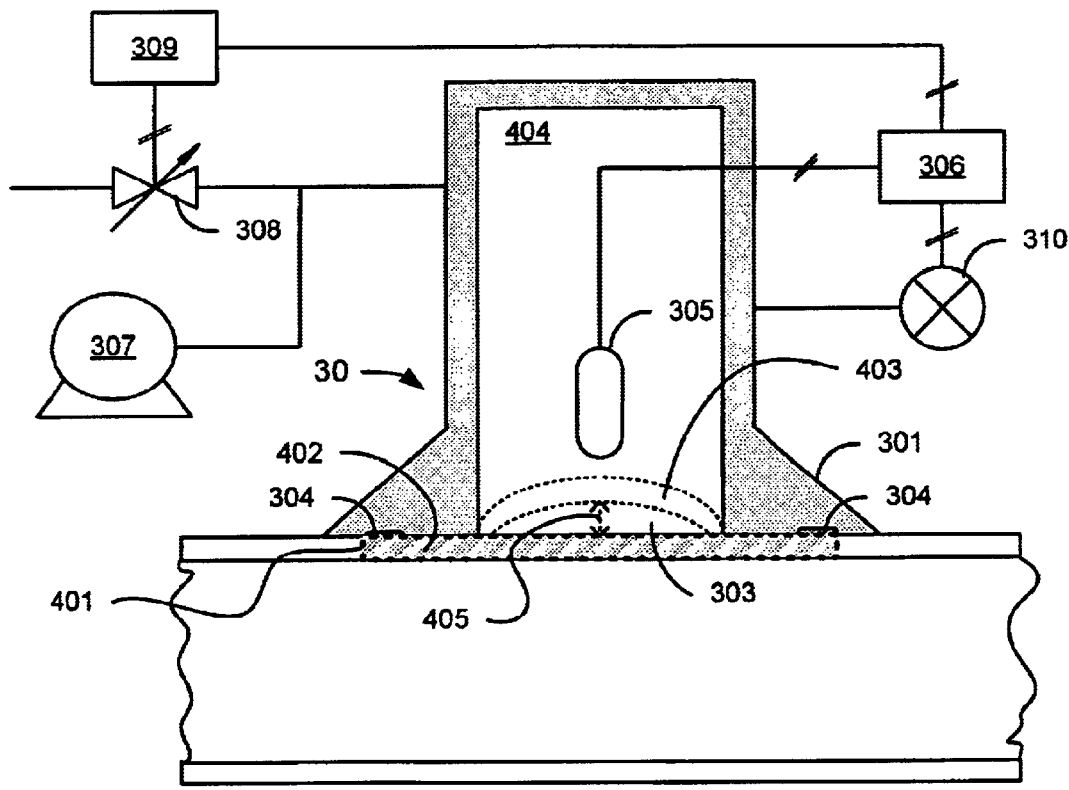
FIG. 4 shows the arrangement measuring head/insulating panel for carrying out the measurement of the internal pressure of the panel of FIG. 1.

FIG. 4 shows how the measurement of the internal pressure of a traditional panel 10 is realized through the system of the invention. In this and in the next figures the same numbering of the previous figures is used, whenever it refers to elements already described above.

The measuring head 30 is supported through the O-ring 304 on perimeter 401 of a portion 402 (shown in figure with dotted lines) of the envelope of the panel; in this way the cavity 302 of the device and the part 403 of the envelope facing the opening 303 define a space 404. The sensor 305 is placed along the longitudinal axis of cavity 302 and can be moved vertically, by getting it closer or more distant from the envelope of the panel; on the contrary during the measurement it remains rigidly fixed in a chosen position. Through pumping system 307, cooperatively working with valve 308, the pressure in the internal space 404 is decreased until it becomes lower than the internal pressure of the panel: in these conditions the part 403 of the portion 402 of envelope facing the opening 303 of the device is subjected to a pressure force directed towards the outside of the panel and raises, not adhering to the internal filling any more. Closeness sensor 305 detects instantaneously the movement of part 403 between a first rest position and a second position (dashed in figure) following the evacuation of space 404; the displacement of part 403 is indicated with numeral 405 in the drawing. The pressure value detected by gauge 310 in the moment in which the part 403 of the envelope moves, is equivalent to the value of the internal pressure of the panel, which is in this way carefully determined. Thanks to the extremely small dimensions of the system, and in particular of space 404, the evacuation of the same is rapid (it can also be realized in a few seconds), especially if compared with that of an evacuation chamber containing the whole insulating panel. As it can be understood from FIG. 4 the system of the invention is structurally simple and not very expensive.

Figure 5:
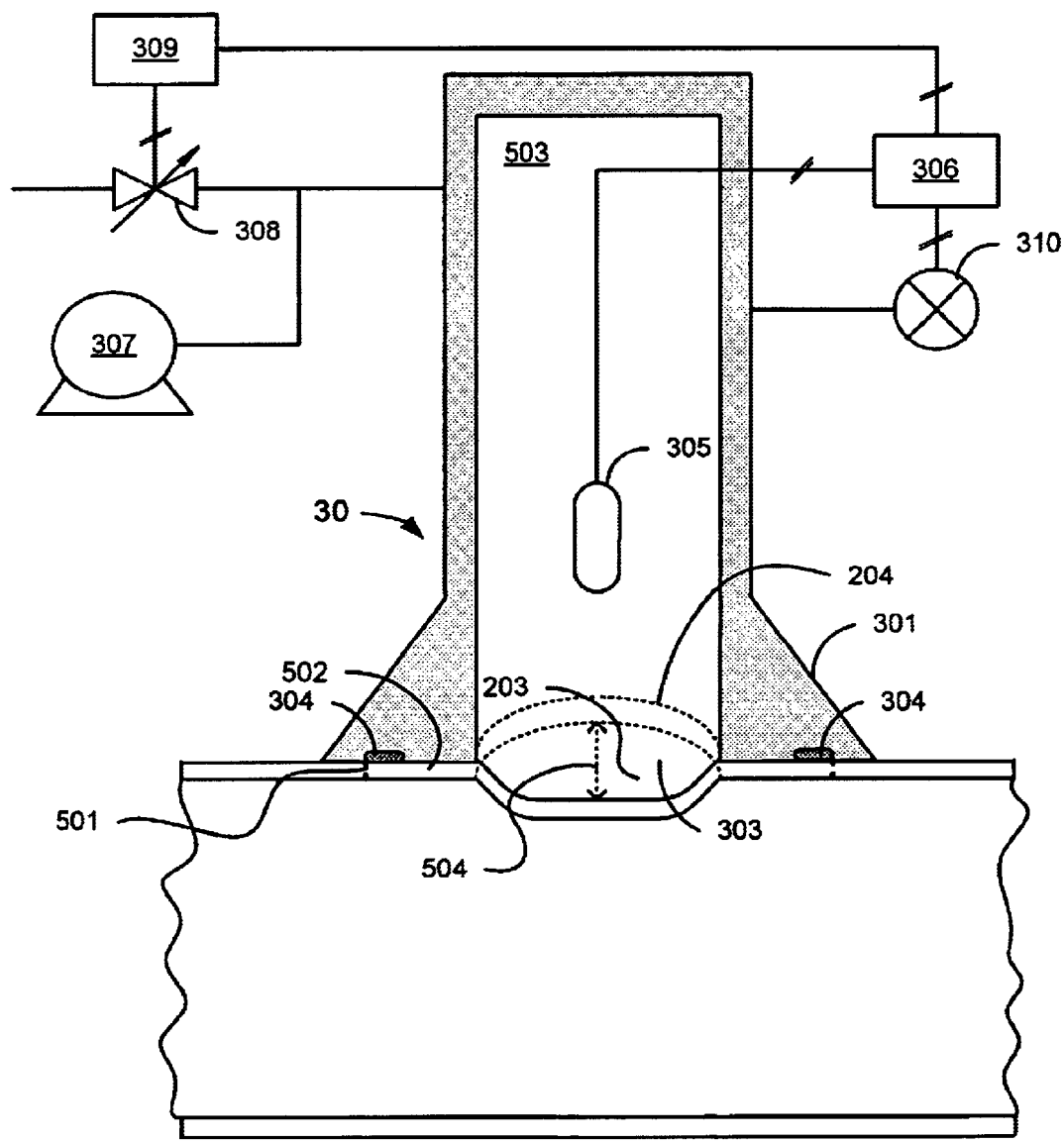
FIG. 5 shows the arrangement measuring head/insulating panel for carrying out the measurement of the internal pressure of the panel of FIG. 2.

In FIG. 5 is shown how the measurement of the internal pressure of a panel 20 having a recess 203 on its external surface is realized through the system of the invention.

Measuring head 30 is supported through the O-ring 304 on the perimeter 501 of a portion 502 of external envelope (shown in figure with dotted lines), so as to cover entirely the recess itself; in this way cavity 302 and the part 204 of the envelope covering recess 203 and facing the opening 303 define space 503. Through the pumping system 307, cooperatively working with valve 308, the pressure in space 503 is decreased until it becomes equal to the internal pressure of the panel: in these conditions the part 204 of the envelope covering recess 203 is subjected to pressure forces, directed towards the inside and the outside of the panel, which equal each other, and in this condition this part 204 of the envelope raises at least up to the level of the surrounding envelope. Closeness sensor 305 detects instantaneously the movement of part 204 between a first rest position and a second position following the evacuation of space 503; this movement is represented in the drawing by numeral 504. The pressure value detected by gauge 310 in the moment when the movement of part 204 is such that it raises up to the level of the surrounding envelope, is equivalent to the value of the internal pressure of the panel, which is in this way carefully determined.

In the above reported description and in corresponding drawings, the pressure gauge 310 and the closeness sensor 305 are connected to an acquisition/elaboration data system 306, but this could be replaced by a simpler acoustic or optic detector, able to show an operator the instant in which the part of the envelope facing the open end 303 raises, at which the pressure shown from gauge 310 equals the internal pressure of the panel. Moreover, other variations in the design so far described are possible; for example, the system could not comprise the frustoconical portion and/or the O-ring type gasket.

Some of the advantages are provided from the following example.

For the measurement of the internal pressure, an insulating panel of type 20 as described above is employed, having a recess 203 with a diameter of 40 mm and a depth of 1 mm.

The internal pressure of this panel is first carried according to a standard method, by gluing a capacitive pressure head to the outer surface of the panel, at a position away from the recess, in such a way that the gluing forms a gas-tight seal, and breaking the envelope of the panel at a point comprised in the so-formed gas-tight region, thus allowing the pressure inside the panel to be read by the capacitive head; the internal pressure results to be 5 hecto-Pascal (hPa).

Then, the internal pressure of the same panel is determined by means of the system of the invention. The system is supported on the external surface of the panel so as to cover entirely recess 203, the pumping system 307 connected to the measuring head 30 is started and the regulating valve 308 is closed, decreasing the pressure in space 503 until it reaches the value of 14.6 hPa. At this point the actual measurement is started, decreasing the pressure in space 503 during time.

Figure 6:
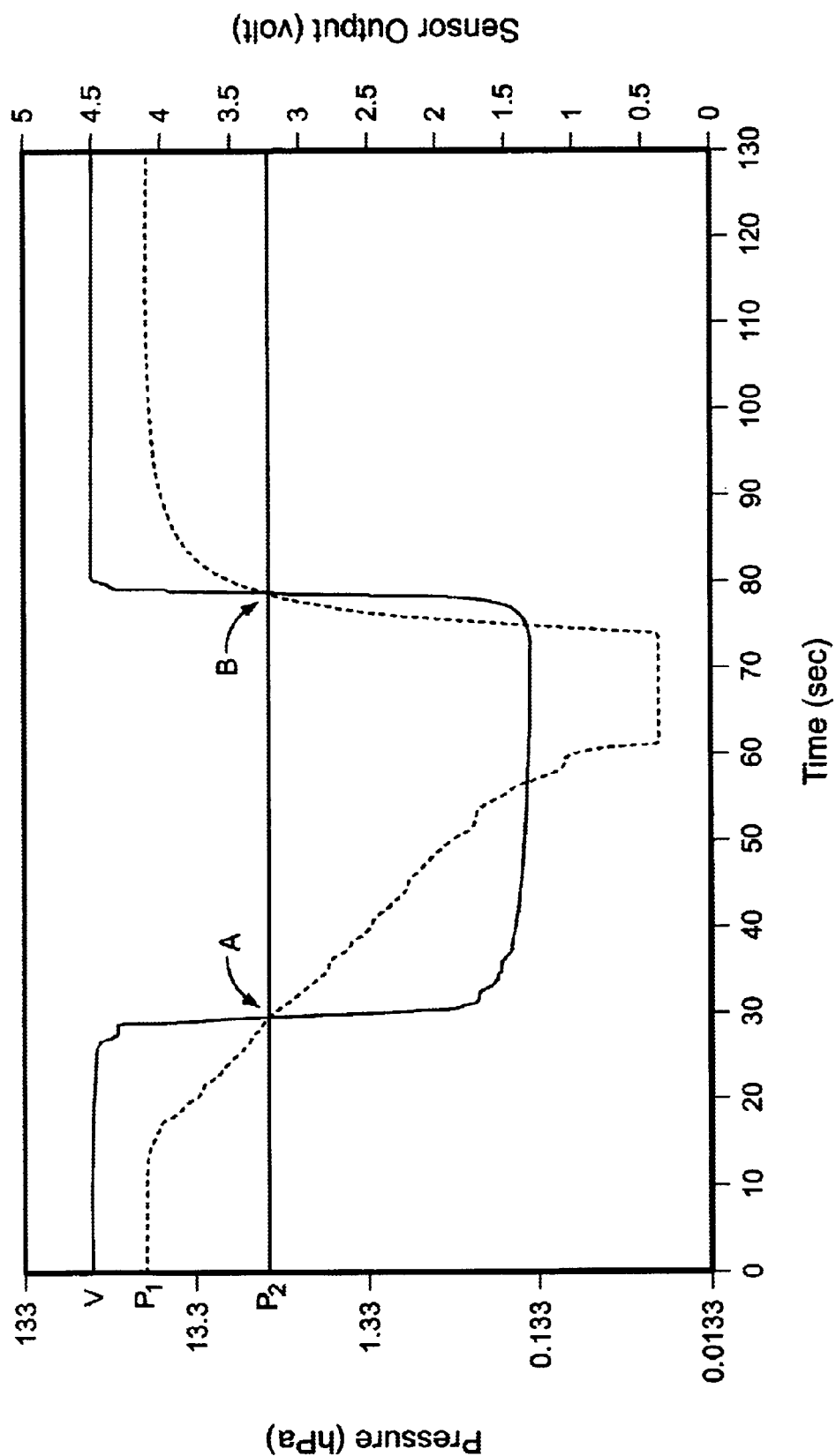
FIG. 6 reproduces a diagram with experimental data obtained through the device of the invention.

FIG. 6 represents the pressure in space 404 (indicated with dotted line P1), the internal pressure of the panel (indicated with continuous and thick line P2), which, obviously, is constant during the period of the measurement, and the voltage signal provided by the closeness sensor (indicated with continuous line V) as a function of time.

As shown in the diagram, the pressure in space 503 is at first reduced at a value of 14.63 hPa and allowed to stabilize for about 15 seconds; at this pressure value the closeness sensor reads a voltage of about 4.5 volts. The pressure in said space is then reduced during time from 14.63 down to 0.027 hPa in 50 seconds. The voltage remains constant at about 4.5 volts until the pressure in space 503 equals the internal pressure of the panel: in these conditions the forces acting on the portion of the envelope covering the walls of the recess, directed towards the inside and the outside of the panel, become equal and the portion of the envelope raises. This vertical movement causes an abrupt reduction of the voltage signal produced by the sensor, shown in the diagram with vertical segment A, down to a value of about 1.3 volts. This voltage remains constant during the further decrease of the pressure of the device to the final value of 0.027 hPa and during a period of time of 15 seconds, during which the system remains at a constant pressure of 0.027 hPa. Finally the pressure of the device is increased again, but more rapidly, and brought back to the original value of 14.63 hPa. Also in the case of the increase it is observed, at a value of the pressure in space 503 equal to the internal pressure of the panel, an abrupt voltage variation, indicated in the diagram with vertical segment B.

As shown the diagram of FIG. 6, the read-out signal (voltage) of the system of the invention undergoes a sudden variation when the pressure in space 503, decreasing or increasing, becomes equal to the pressure inside the panel. By detecting with suitable means the instant of this sudden change, and the pressure value in space 503 at this moment, it is possible to determine exactly the internal pressure of the panel.

It should be clear to those skilled in the art that the above example is only one embodiment of the invention and other values would be appropriate in obtaining the desired information in alternate embodiments. Although there have been clearly detailed examples in this specification, the spirit and scope of the invention can clearly be applied to other applications and the examples should not be limited by the above descriptions, but rather defined by the claims below.

Having described our invention above, we claim:

1. An apparatus for non-invasive measuring of the internal pressure of a vacuum panel comprising:

a measuring head, wherein said measuring head includes a jacket; wherein said jacket includes a cavity, said cavity defined by a first end on said jacket, said first end configured to be in contact with an envelope on said vacuum panel creating a seal;

a motion detector located in said jacket, said motion detector configured to detect the movement of a part of said envelope on said vacuum panel facing said open end;

a pumping system connected to said cavity; and a pressure gauge connected to said cavity, wherein said motion detector includes a closeness sensor, and wherein the closeness sensor can be vertically moved along the longitudinal axis of the cavity before measuring the internal pressure of the panel, and during the measurement it is fixed in a chosen position.

2. The apparatus of claim 1, wherein said motion detector is configured to detect the instant when said movement occurs.

3. The apparatus of claim 1 wherein said motion detector is configured to measure the pressure value in said space at said instant.

4. The apparatus as recited in claim 1 wherein said jacket is formed of a cylindrical hollow body and of a frustoconical portion at the open end of the cavity.

5. The apparatus as recited in claim 4 wherein the frustoconical portion has, on the external edge at the opening, an O-ring type gasket.

6. The apparatus as recited in claim 1, wherein the jacket is made of a material selected among metals, metal alloys, plastic or vitreous materials.

7. The apparatus as recited in claim 6 wherein said material is steel.

8. The apparatus as recited in claim 1 wherein the closeness sensor is of the inductive type.

9. The apparatus according to claim 1 wherein said motion detector comprises an acquisition/elaboration data system.

10. The apparatus according to claim 1 further comprising a system set to check the pressure, said checking system formed of a proportional valve and of a relative control unit.

11. A method for non-invasive measurement of the internal pressure of a vacuum panel comprising the steps of:

gluing a capacitive pressure head to the outer surface of a vacuum panel; and determining the internal pressure of the same panel, wherein the step of pressure determination includes the steps of:

the pressure in space is at first reduced at a first value of and allowed to stabilize for about a value of a first amount of time;

the pressure in said space is then reduced during time from a second value down to a third value in a second amount of time;

the voltage is allowed to remain constant until the pressure in space equals the internal pressure of the panel;

the voltage remains constant during the further decrease of the pressure of the device to a final value and during a period of time of a third amount of time, during which the system remains at a constant pressure; and the pressure of the device is increased again more rapidly, and brought back to the original value.

12. A device for determining pressure in an environment by measuring deformity of a panel interposed between the environment and the device, comprising:

a jacket having a cavity defined therein, wherein said jacket includes an edge that defines an opening into said cavity, wherein said edge is configured for coupling to a first side of a panel such that a portion of the first side of said panel forms a cover for said opening;

a vacuum pump, in fluidic communication with said cavity, for at least partially evacuating said cavity;

a sensor, coupled to said jacket, that is used to produce an output related to relative position of said portion of said panel; and a pressure gauge, coupled to said jacket, that is used to produce an output related to pressure within said cavity, wherein the output of said sensor and the output of said pressure gauge are for provision to a system configured to determine, using said outputs, pressure in an environment at least partially defined by a second side of said panel.

13. The device of claim 12, wherein said portion of said panel includes a recess, and wherein when said vacuum pump evacuates said cavity, said recess rises toward said cavity.

14. The device of claim 13, wherein when said recess rises to a height approximately equal to surrounding portions of said panel, the system determines that the pressure of said environment is approximately equal to pressure in said cavity.

15. The device of claim 12, wherein said sensor is moveably mounted to said jacket.

16. The device of claim 15, wherein said sensor is rigidly fixable at a vertical position relative to said panel.

17. The device of claim 12, wherein said sensor includes a closeness sensor that produces said output related to the relative position of said portion of said panel to said closeness sensor.

18. The device of claim 12, wherein said sensor includes an inductive closeness sensor.

19. The device of claim 12, further comprising a valve, coupled to said vacuum pump, through which said cavity is at least partially evacuated when said vacuum pump evacuates said cavity.

20. The device of claim 12, wherein said panel includes getter material.

* * * * *

UNITED STATES PATENT AND TRADEMARK OFFICE
CERTIFICATE OF CORRECTION

PATENT NO. : 6,935,183 B2
DATED : August 30, 2005
INVENTOR(S) : Ferrario et al.

It is certified that error appears in the above-identified patent and that said Letters Patent is hereby corrected as shown below:

Title page,
Item [57], ABSTRACT,
Line 3, "an cavity" should read -- a cavity --.

Column 2,
Line 67, "open end;" should read -- open end. --.

Column 3,
Line 7, "achieved different" should read -- achieved in different --.
Lines 41-42, "an envelope or depression 101, which" should read -- an envelope 101, which --.

Column 7,
Line 4, "an envelope on said" should read -- envelope of said --.

Signed and Sealed this

Twentieth Day of December, 2005

JON W. DUDAS
*Director of the United States Patent and Trademark Office*